(12) United States Patent
Battenberg

(10) Patent No.: US 8,090,672 B2
(45) Date of Patent: Jan. 3, 2012

(54) DETECTING AND EVALUATING OPERATION-DEPENDENT PROCESSES IN AUTOMATED PRODUCTION UTILIZING FUZZY OPERATORS AND NEURAL NETWORK SYSTEM

(76) Inventor: Günther Battenberg, Marburg (DE)

( * ) Notice: Subject to any disclaimer, the term of this patent is extended or adjusted under 35 U.S.C. 154(b) by 894 days.

(21) Appl. No.: 11/883,833

(22) PCT Filed: Feb. 7, 2006

(86) PCT No.: PCT/EP2006/001076
§ 371 (c)(1),
(2), (4) Date: May 23, 2008

(87) PCT Pub. No.: WO2006/084666
PCT Pub. Date: Aug. 17, 2006

(65) Prior Publication Data
US 2009/0006300 A1    Jan. 1, 2009

(30) Foreign Application Priority Data

Feb. 11, 2005 (DE) .......................... 10 2005 006 575

(51) Int. Cl.
*G06N 5/00* (2006.01)
(52) U.S. Cl. ........................................................ 706/47
(58) Field of Classification Search ..................... 706/47
See application file for complete search history.

(56) References Cited

U.S. PATENT DOCUMENTS

| | | | |
|---|---|---|---|
| 5,465,221 A | 11/1995 | Merat et al. | |
| 2003/0028353 A1 | 2/2003 | Gventer | |

FOREIGN PATENT DOCUMENTS

| | | |
|---|---|---|
| DE | 199 62 967 A1 | 7/2001 |
| DE | 101 22 824 A1 | 11/2002 |

OTHER PUBLICATIONS

Mitra, S. et al., "Neuro-Fuzzy Rule Generation: Survey in Soft Computing Framework", IEEE Transactions on Neural Networks, vol. 11, No. 3, May 2000, pp. 748-768.*
Siraj, F. et al., "Quality Function Deployment Analysis Based on Neural Network and Statistical Results", IJSSST, vol. 9, No. 2, May 2008, pp. 73-81.*
Msimang, Ntsika (2004). Neural network models for detecting concurrent abnormal patterns in control charts and for developing shorter and non-biased intervals for process capability index estimators. Ph.D. dissertation, State University of New York at Binghamton. Retrieved Jul. 16, 2011, from Dissertations & Theses: Full 139 pages.*

* cited by examiner

*Primary Examiner* — Michael B. Holmes
*Assistant Examiner* — Ola Olude-Afolabi
(74) *Attorney, Agent, or Firm* — Clark & Brody

(57) ABSTRACT

A system (10) testing and rating operation-dependent processes and/or components (20) in automated production and test sequences comprises a robot (12) which by means of a minimum of one sensor (14, 16) detects test/measured values (M) of at least one operating and/or display element (22, 24) of the component (20) to be tested respectively rated and transmits to an analyzer (40) analyzing and rating the measured values (M) by means of defined quality functions (50), said quality functions by means of operators (52) imitating human rating schematics respectively rules and based on this processing result generating at least one rating.

32 Claims, 5 Drawing Sheets

Figure 1:
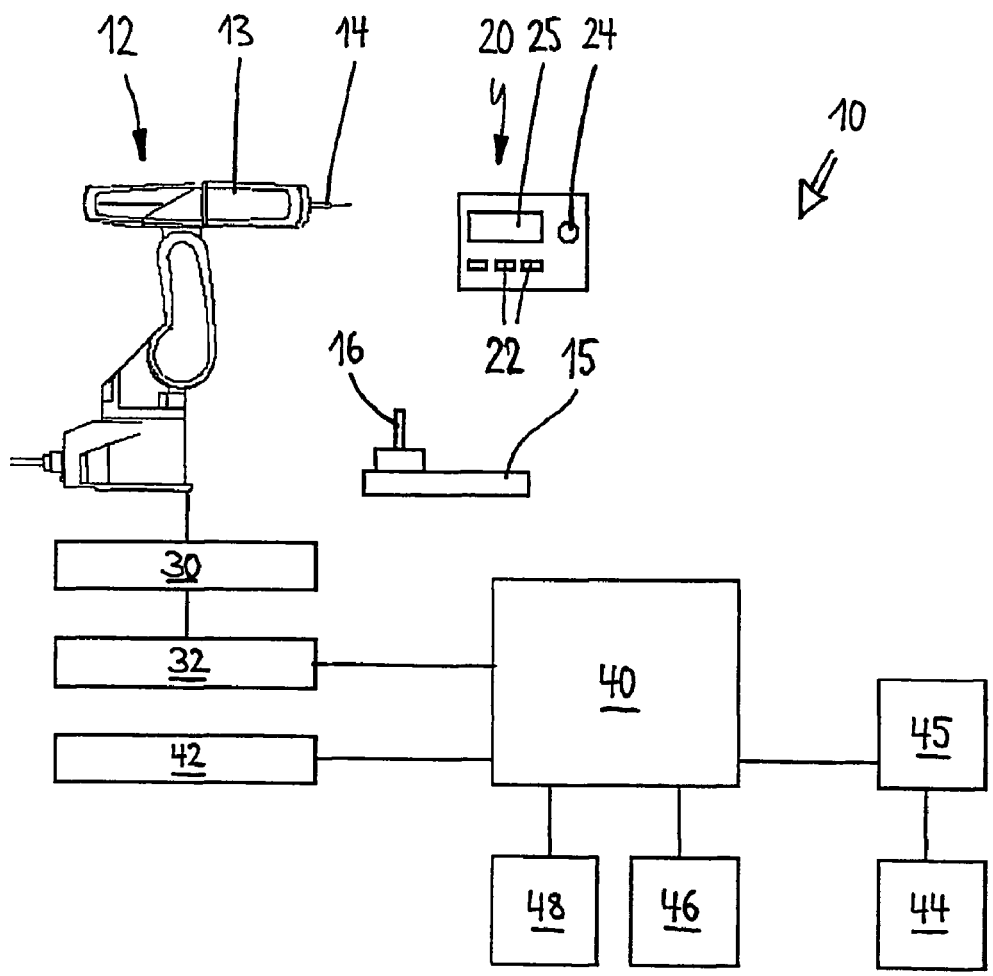

DETECTING AND EVALUATING OPERATION-DEPENDENT PROCESSES IN AUTOMATED PRODUCTION UTILIZING FUZZY OPERATORS AND NEURAL NETWORK SYSTEM

The present invention relates to a system detecting and rating operation-dependent processes and/or components in automated production and test sequences.

Quality control of production processes in general involves periodically testing such processes or finished components, each test value being detected individually and then checked that in fact it is within a predetermined tolerance range. Illustratively such default ranges are determined by testing manually made prototypes and production-dependent tolerance ranges then being set.

In one procedure illustratively known from the patent document DE-A1-199 62 967, conventional quality control during manufacture entails taking test values and comparing them with defined processing limits. When such bounds are crossed, a defect signal is generated to separate the particular product as being "incorrect". The processing boundaries are computed based on the standard deviation or test values recorded during a learning stage, that is, statistically, to allow matching the processing limits to the particulars of different production procedures.

Such known systems/methods incur a significant drawback in that a single deviation from the predetermined tolerance range found in a test value is cause enough to separate the particular product as being "incorrect". However the probability of defect is high in complex products entailing many test values, already because a random fluctuation of a single process parameter may lead to a deviation beyond the tolerance boundary, even though such an "defect"might not even be detected by a human observer viewing the end product. As a result rigorously obeying the setpoints/reference values frequently results in high waste, that is lack of rationality in production costs is incurred.

As palliation/remedy, the patent document DE A1 101 22 824 proposes a method analyzing processability and process performance. For that purpose a limit curve is defined which limits the mean process dispersion position by restricting the zero defect position and by using a statistical tolerance. Based on a plurality of measurements taken beforehand and using a theoretical expression, a plot is drawn which contains a boundary line. This boundary line marks the zero defect range and is used to rate processing performance. This performance is based on tolerance and dispersion width. Thereupon several ranges are defined representing different classes of processing performance. Depending on the ratio of tolerance to dispersion width, the test values may be assigned to different classes.

This design entails the drawback that a customer rates product quality as a whole, in other words, whether the end product is satisfactory overall. This is the case especially for products of operation-dependent procedures. In this case it is important foremost that all operating elements can be used in similarly well controlled manner. Customer decision is mostly based on context and comparability with other operating elements or products. No differentiation takes place between individual operations. Accordingly implements may be found unacceptable by conventional quality control systems because individual test values that do not meet the fixed standards may still be considered quite positively by the final consumer, whereas complaints arise with objects that "passed" quality control because, for instance, the operability of several switches was perceptibly different to humans.

Moreover the final consumer thinks only in two categories (good-bad). The perception of quality is always based on subjective perceptions affecting the rating scale for instance including "average", "good but slight shortcomings", "above average". Such rating scales cannot be automated by the known quality control systems.

The objective of the present invention is to create a system detecting and rating operationally dependent production and test sequences allowing automated and differentiated quality ratings in different categories. Such quality rating shall be objectively reproducible and hence be independent of production site, in particular it shall assure constant product quality. It should also allow rating the performance of operating and display elements when compared to other operating and display elements of the same system. In particular test values detected by robots in mathematically comprehensible and hence automated manner shall be rated, selected customers' rating criteria being imitated in more appropriate form.

A system of the present invention to test and rate operation-dependent processes and/or components in automated production and testing sequences comprises a robot which detects test values of the component to be rated by means of at least one sensor at a minimum of one operational element and/or display element and which feeds said test values to a rating unit. Said rating unit analyzes and rates the test values by means of defined quality functions that, by employing appropriate operators, reproduce human rating patterns or rules and on that basis display a rating in at least one rating display.

Such a rating system allows imitating, in automated production and testing procedures, a human expert who would carry out quality assessments based on accurate test data. By means of the quality functions, a rating diagram taking into account gradual transitions between the fixed boundary values of criteria (yes/no) is formally reproduced. Also compensating links of individual criteria can be processed into one total result, namely a quality rating. In this manner comprehensible and testable ratings may be carried out in automated manner and may be weighted differently by means of operators and predetermined parameters. Accordingly the system of the present invention makes it possible to formalize human rating criteria in objective, reproducible manner.

Further system advantages are listed as follows:
  simple drafting of quality functions by means of comfortable and intuitive user surface,
  representing operator trees at different detail steps,
  graphically supported modeling of individual criteria by scalable, arithmetic, statistical and logical operators,
  perception processing to broaden the test values,
  learning procedures to match parameterized rating functions to the behavior of human experts,
  data mining to analyze the rating procedure,
  identifying mandatory criteria, inferences regarding the production process,
  recognizing error/defect sources in quality deviations.

The rating system of the present invention is characterized substantially by the following:
  gradual transition between "correct" and "incorrect" in the overall rating, making possible differentiated quality assessments in different categories,
  gradual transitions also with respect to individual criteria, whereby tolerance ranges may be rated in differentiated manner and greater freedom from operationally caused shifts in test values is increased, interaction between individual criteria in the overall rating, so that the quality of elements also is rated in relation other elements, feasibility to compensate "poorer" through "better than average" properties.

Further features, particulars and advantages of the present invention are defined in the appended claims and in the description below of illustrative implementations/embodiments and in relation to the appended drawings.

Figure 2:
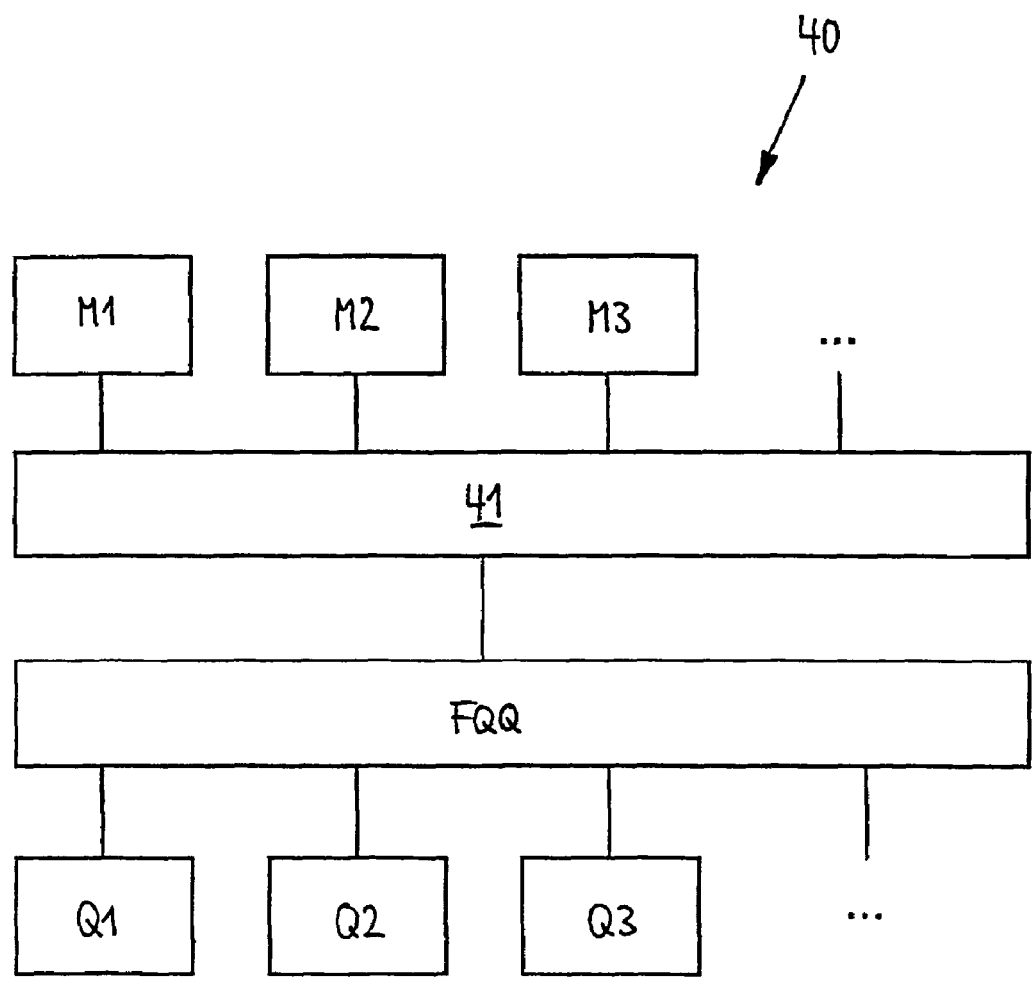
Figure 3:
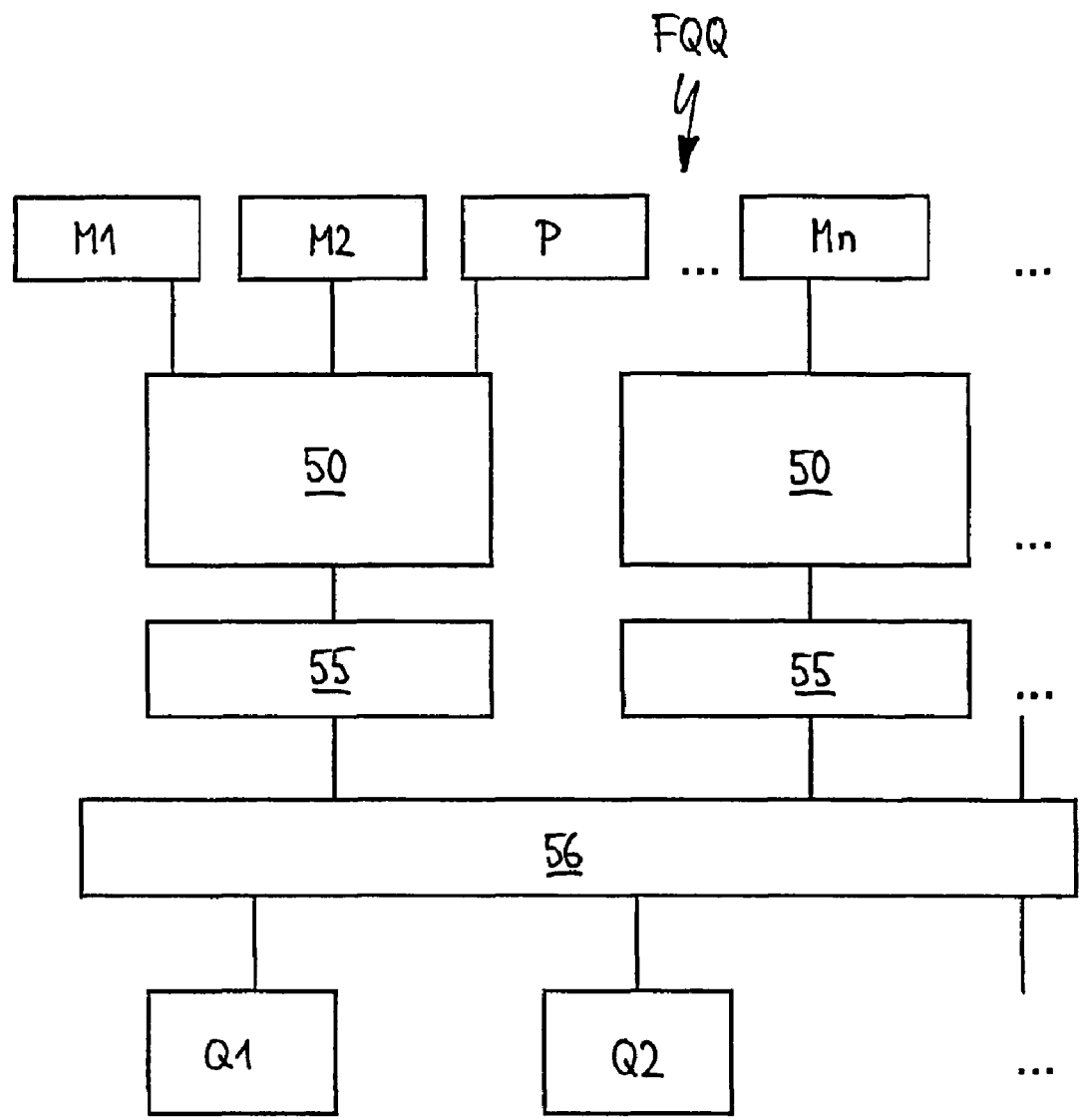
Figure 4:
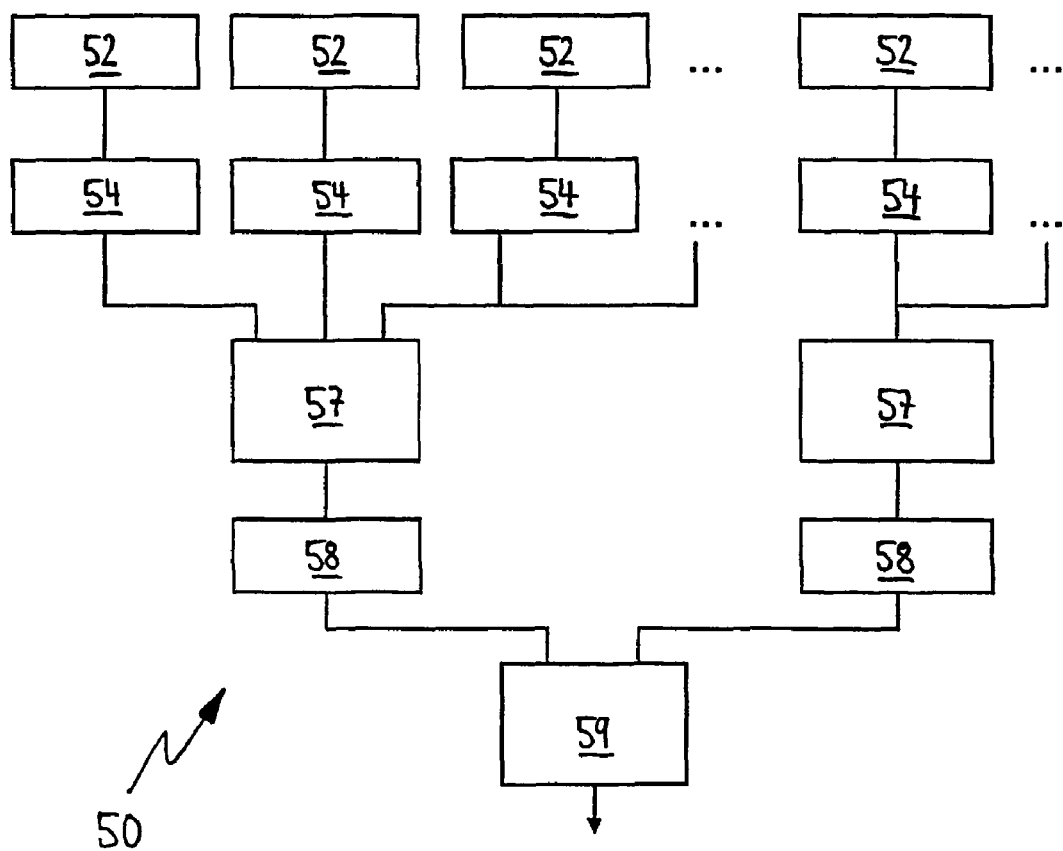
Figure 5:
Figure 6:
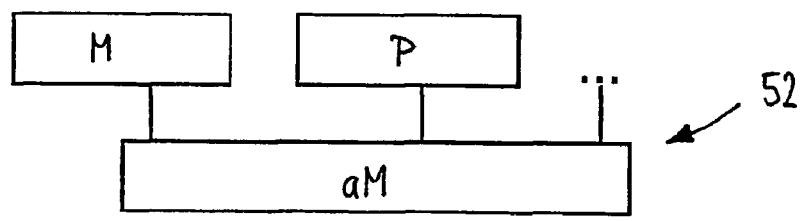
Figure 7:
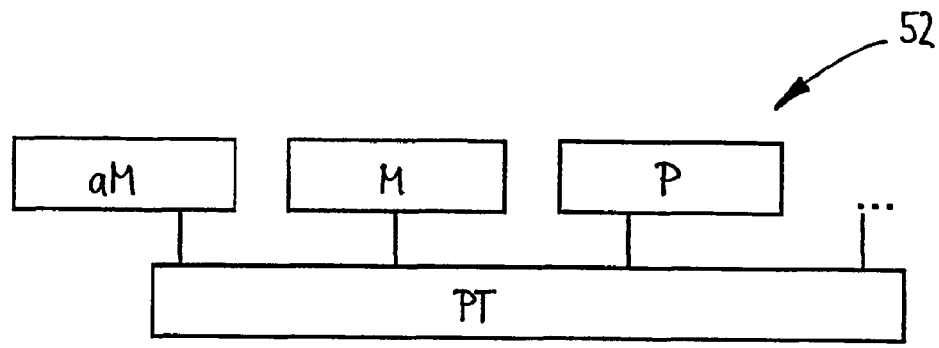
Figure 8:
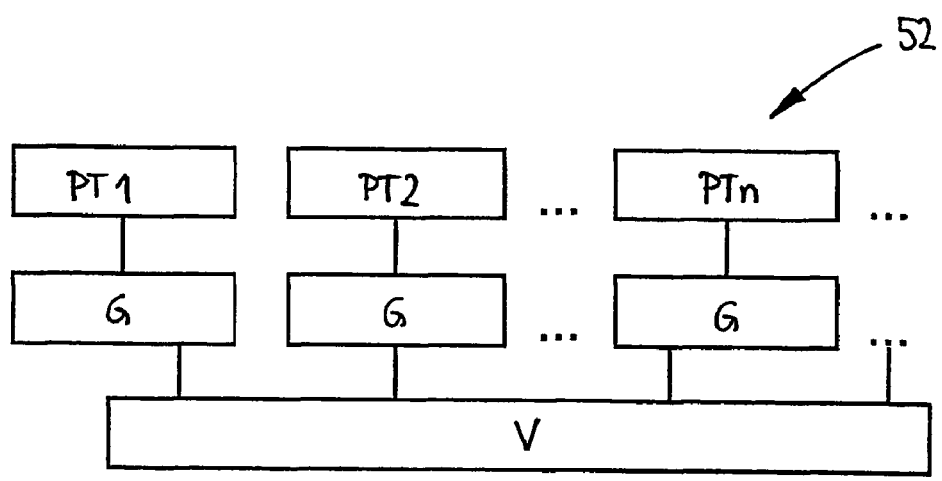

FIG. 1 schematically shows a system detecting and rating operation-dependent processes and/or components in automated production and testing sequences, FIG. 2 schematically shows a rating unit, FIG. 3 schematically shows a Fuzzy Quality Quantifier, FIG. 4 schematically shows a quality function, FIG. 5 schematically shows an operator, FIG. 6 schematically shows another operator, FIG. 7 schematically shows a further operator, and FIG. 8 schematically shows still another operator.

The overall system 10 shown in FIG. 1 serving to test and rate operation-dependent processes at components 20 illustratively is designed for automated quality control of car radio panels or motor vehicle climate control.

A testing robot 12 is fitted at a CNC robot arm 13 with a sensor 14 such as a force or path detector driving individual operating and/or display elements 22, 24 at an operating console 20, for instance being keys/buttons 22 or an adjusting element 24. Further sensors 16 or tools accessible to the robot arm 13 may be deposited on a console 15 near the robot 12, for instance optical, acoustic or haptic (palping) test implements. Accordingly mechanical, electrical, haptic, optical and/or acoustic test values may be picked up, for instance button clicks or operational noises. However loudspeakers, luminous elements, displays or surface properties also may be measured.

The test/measured values M detected by the sensors 14, 15 as a function of the displacements and/or angles of the robot 12 and preferably recorded in real time are picked up by an electronic test value recorder 30 and digitized by subsequent electronic circuit 32 and then fed to a central analyzer 40, preferably a computer, analyzing and rating the test values M by means of defined quality functions 50 (FIGS. 2 and 3). The quality functions 50 imitate human rating diagrams/rules by means of operators 52. At least one rating is then issued on the basis of such processing (FIG. 4), such ratings preferably being assigned as "feels good" factors to various classes of quality (Q1, Q2, Q3. Additionally or alternatively, an index may be derived representing an overall product rating.

At least one memory 42 is connected to the computer 40 and stores the measured values M as well as other data and/or interim results. Using an input device 44, preferably a keyboard or a mouse, the quality functions 50 may be drawn up, the corresponding operators 52 may be selected, and the constants, parameters 54, 55 and/or further data may be fed into the system 10. The display is implemented preferably using an editor 45 that can be displayed on an omitted monitor. Using an output device 46, preferably a further monitor or a printer (also omitted), the rating results or inferences may be visually displayed. Moreover, using an interface 48, the data may be transmitted further to an external memory, a further computer, for instance a Notebook, or to a network.

As schematically shown in FIG. 2, measured values M1, M2, M3 are selected by a selection unit 41 within the analyzer 40 and then are analyzed and rated by a software unit FQQ. Said software unit substantially is constituted by the quality functions 50 which imitate a hierarchical structure (FIG. 3) and can preferably be represented as an operator tree. The tree can be individually set up by means of an editor 45. Such a tree comprises various, selectable and predeterminable operators 52, as a result of which the software unit FQQ not only carries out a dichotomous quality rating, but also a gradual, constant quality rating which by means of the operators 52 and the definable or predeterminable weighting parameters 54, 55, 58, G is comparable to human behavior.

The basic design of the software FQQ is shown in FIG. 3. A quality function always is an image which assigns to an object $\omega$, respectively to an associated vector $x(w)=x1 \ldots xn)$ consisting of n measured values M, a value G of "quality criteria: Q: $X1x \ldots xXn \rightarrow G$, where Xi is the range of values of the ith measured value M. The output $Q(x)$ is interpreted as a fuzzier (multivalued) truth value of the result of optimal quality of the rated object. In particular $Q(x)=0$ and $Q(x)=1$ respectively indicate wholly inadequate and optimal quality.

Next each quality function 50 is weighted by means of the parameters 55. These values are detected by a rating function 56 and consolidated into an overall result. This overall result then may be associated to the quality classes Q1, Q2, Q3, be defined as a "feels good" factor and or be transmitted in the form of an index.

In a more general way, instead of using the M measured values, also so-called perceptions P may be used as the arguments of the quality functions 50. This procedure allows for instance inputs of "light blue" or "a little too small" that are detected, not by a sensor 14, 16, but by a human observer, for instance by visual inspection. Such values may be modeled in blurred form (Fuzzy Sets).

As shown in more detail in FIG. 4, each quality function 50 is constituted by several operators 52 which are combined into sets and may be weighted relative to each other and/or are weighted within on quality function 50 by means of parameters 54. Another operator node 57 implements rating by means of the said weighting and transmits the results to a further rating function 59 which by means of a previously defined further weighting 58 combines all criteria into an overall decision.

Be it noted that the lower operators build directly on the measured values M respectively the perceptions P and, by means of the functions 57 of the form $\pi j: X1x \ldots xXn \rightarrow [0,1]$, lead to an inference which is represented by a value from the unit interval [0,1]. The truth value of this step then can be interpreted as the truth value of the statement "criteria fully met".

These weighted individual ratings then are combined into an overall result by means of the functions 59 of the type $\lambda:[0.1^j \rightarrow [0.1]$.

As a result, each quality function 50 is part of hierarchical structure simplifying the formulation also of more complex quality functions 50 by subdivision into individual ratings. Because rating an object 20 in general takes into account different criteria which in turn may be resolved into subcriteria, the quality functions 50 are represented as an amalgamation of hierarchically organized sub-decisions. Beginning with smaller criteria to reach ever more comprehensive decisions, the quality functions 50 may be intuitively replicated.

The system 10 of the present invention supports such a hierarchical design by making available a graphics service surface 45 allowing describing the quality functions 50 in the form of a tree structure and to parameterize them. In this process partial trees may be amalgamated into nodes to allow improved overview. Formally the quality function 50 therefore is represented as an operator tree, each tree node corresponding to one operator 52. The successors of a node 52 provide the input arguments of the corresponding, following operators 57, 58.

FIGS. 5 through 8 show the various types of operator 52.

In the simplest case the operator 52 is represented by a measured value M or a constant K (FIG. 5). Measured values M as well as defined constants K therefore constitute the lower-most input layer. The input source of measured values M therefore are those measured by the robot sensors 14, 16. However other input sources also are applicable, for instance direct robot-computer connections or data banks.

As already mentioned above, perceptions also may be used in general as inputs. Illustratively those inputs are admissible which can be detected not by a sensor but only by a human observer. Illustratively visual inspections such as "light" or "a little too dark" may be processed in the form of fuzzy values.

The connection of measured values M and/or perceptions P leads to the so-called derived measured values aM. Illustratively such aM values are an average of several measured values M FIG. 6).

Besides standard arithmetic operations (addition, multiplication etc.), complex operators also may be used. The latter may then applied to truth values which in principle also represent real numbers. In turn the operators 52 may be nested further; be it borne in mind in this respect that the linking of truth values in turn results only in rare cases in a new truth value (in which event the operators 52 in their output form match dynamically the expected, possible outputs).

To allow further flexibility, a conceivable operator would be such as to allow more complex operators that would be defined by the user by means of a formula interpreter. Illustratively several linked operators 52 would be combined into a single new operator.

The schematically predicates PT illustratively shown in FIG. 7 are used to rate the measured values M and/or perceptions P per se or the measured values aM derived from them. Real numbers are expected as inputs, though truth values also may be related thereby to each other. The output values always are values from the range [0,1] reflecting the fuzzy truth value of the inference "predicate was fully met".

Illustratively a (fuzzy) interval test is carried out as a singe-digit predicate, said test directly combining an association function into one parameter 52 that can be parameterized. This parameter serves to check whether measured values are situated within a given range. The output from the range [0,1] then reveals to what degree the transmitted value is situated within said range.

Said test can be carried out in various ways:
1. Checking that the transmitted M value accurately corresponds to a given, predetermined value. If so, the output value is 1, otherwise it is 0.
2. Range/interval test. The output is 0 or 1 depending on the display "M∈[a,b]" applying or not. The terms a and b are the parameterized range boundaries.
3. Being associated with the range is determined using a trapezoidal function. Because of the fuzzy boundaries, all values in the range [0,1] may be assumed being the degree of association.
4. The range association is calculated using a PI function. This is also a fuzzy association function that however provides smoother transitions than the trapezoidal function.

Besides defining a single-digit predicate PT, two-digit predicates may also be defined, for instance relations.

The logic link V shown in FIG. 8 preferably is a conjunction, for instance several predicates P1, P2, P3 being combined by weighting parameters G into one logic interconnection. As a result, illustratively, meeting one predetermined criterion requires meeting all sub-criteria. The multi-value logic provides a set of generalized conjunctions. If for instance the number of the truth values corresponds to the unit range [0, 1], then so-called T standards are applicable as operators 52. Such T standards for instance are the minimum operator and the Lukasiewicz T standard. In addition, or alternatively, the operator 52 also may be a disjunction in the form of T and S standards.

Alternatively or in addition to the purely conjunctive operators, compensatory operators also may be used. In this manner one might compensate to some degree a less satisfactory sub-criterion with a well obeyed sub-criterion. A simple example of such an operator is the arithmetic mean or compensatory min-max merged standards.

By adjusting one of the parameters 54, 55, 58 G, the user always may ascertain in simple manner how rigorously to proceed in rating a criterion, i.e. the user per se may determine the degree of compensation. Moreover individual sub-criteria may be weighted with respect to their relevance (FIG. 4).

One purpose of the present invention's system 10 is to enable the user to intuitively compile quality functions 50. Instead of directly offering the user less comprehensible aggregation operators 52, respectively even allowing the user to define them, the matching aggregation operator is selected intuitively, for instance by allowing the selection of the rigor or the degree of compensation of the operator 52 for instance in the editor 45 by means of an omitted sliding control. Merely by "sliding", the user selects how rigorous to be when rating a criterion.

Also a relevance of sub-criteria may be set in that their weighting 54, 55, 58, G relative to other sub-criteria shall either be raised or lowered.

In order to package several aggregation operators into one operator, the system 10 depending on the position of a sliding control between the following aggregation operators switches internally between the following features:
  The drastic as well as weakly drastic T and S standards are offered as the very extreme conjunction respective disjunction,
  The so-called Yager class begins as a parameterized operator with the Lukasiewicz T respectively S standard as the lower limit. The parameter of the Yager class is increased exponentially by shifting the sliding control in order to switch as rapidly as possible between small and large parameters and thereby to offer a wide spectrum of standards based on the Yager class.
  The Yager class converting to a minimum or maximum, parameterization approaches relatively well the ensuing fuzzy AND and fuzzy OR that take up the largest range of the slider control and the intersection of which represents the arithmetic mean. Fuzzy ANDs and fuzzy ORs are used as compensatory operators because the switch seamlessly between minimum and maximum.

Alternatively so-called OWA operators may be used because allowing also linguistic defaults such as "most" and "almost all" in intuitively operable manner. Yager proposed the Ordered Weighted Averaging operators in 1988. The are part of the class of min/max merge standards and compensate between minimum and maximum.

Illustratively a concrete conversion of the invention's system 10 takes place as follows:

A new design is typically used in new car models also as regards their interior, including operating consoles for radio and climate control. Increasing attention is paid to smooth interaction between all operating elements. Frequently enough, more than individual operating elements such as keys and switches of new car models have been fully redesigned. It is important therefore that following protracted design research on individual prototypes, the final appeal should also be preserved in production.

In the present instance, the operating console 20 of a climate control such as shown schematically in FIG. 1 is being rated. The console 20 comprises several buttons 22, a rotary knob 24 to regulate heating, and an LCD 25.

The sensors 14, 16 record measured values M respectively test curves relating to the buttons 22 and of the rotary knob 24 for purposes of quality control.

To test the buttons 22, the measuring robot 12 depresses them as far as a predetermined threshold force and then retracts whereby the buttons return into their initial positions. The force vs distance function of all buttons 12 is recorded in both displacement directions. The measured values M are digitized by the electronic circuit 32 and are filed by the rating unit 40 as a measurement series in the memory 42.

The measurement series analysis carried out by the rating unit 40 determines the position at which the force first rises, the end position of the force function and the magnitude and position of the maximum force required to drive a button 22.

The temperature control 24 acts in both directions as a switch and always is returned by springs into its initial position. Consequently the temperature cannot be read by means of the switch position but instead is regulated by the time during which the rotary knob 24 is being actuated. The instantaneously adjusted value is always shown in the display 25. Rotation to the left entails lowering the temperature, to the right a rise in temperature.

The torque function measured by rotating the temperature control 24 is similar to the force function observed during button operation. In fact the analysis algorithm substantially corresponds to that of the button 22.

As regards prior quality ratings, separate checks are carried out at all relevant measurement values M whether they corresponded to a production-dependent permissible tolerance of the default values. If only one of the measured values M exceeds the tolerance limits, the device 20 is patterned respectively checked and optionally retrofitted.

In the system of the present invention on the other hand the operating console 20 can be rated by defined rules whereby also a human expert may do the rating. Illustrative rules may be as follows:

R1 The switching point at the buttons 22 shall be clearly perceptible, though not "jittery".

R2 The "feel" of all buttons 22 should be the same.

R3 The switching point at the temperature control 24 should quickly follow the perceptible rise in force.

R4 The buttons 22 and the temperature control 24 should be in harmony.

To quantify the rule R1, the expressions "clearly perceptible" and "jittery" are first determined empirically.

Under Weber's law, the physiological differential threshold, that is the differential stimulus, required to be barely perceptible, is proportional to the relative increase in stimulus, within wide limits. The stiffer a button 22, therefore, the more pronounced also the force decrease at the click in order to be perceived as being "clearly perceptible".

Because the brain will extrapolate the sequence of the rise in force and because other factors also are involved, for instance how the operator senses the switching point, the quality rating will not consider absolute measured values but instead rate the force decrease made relative to the compliance of the button 22. The transition between "clearly perceptible, non-jittery"and a "jittery" respectively "hardly perceptible" switching point will not be abrupt but fluid.

The automated rating how "agreeable" a human would perceive the switch point therefore is modeled by means of the quality functions 50 and the operators 52 as a "fuzzy interval"and by means of the normalized decrease in force, where moreover the parameters 54, 55 of the fuzzy operator may be a function of the actual kind of buttons or their like. Illustratively an "agreeable" button may be taken as the reference from among those of a test series which optimally meets all quality criteria. It is assumed moreover that for a 30% increase/decrease of such a reference value, the switching force is perceived as "no longer agreeable" whereas test values deviating by 1% still shall be considered "very pleasant".

In order that the "feel" of all buttons 22 shall be the same, (rule R2), all measured values M of the switches 22 shall be identical.

This checkup may be carried out with the system 10 of the invention for instance by calculating the particular statistical range of the pertinent characteristics of all buttons 22. For the case of "approximately the same feel", the particular ranges should be closely to zero, and this feature can be checked again by an "approximately zero" fuzzy interval. The particular checks of the statistical ranges are calculated with respect to one another using an aggregation operator 52 which is set to be slightly compensating so that the good agreement in one characteristic may compensate the other.

Rule R3 comprises two checkups. On one hand the rule requires that a "perceptible"rise in force be involved. On the other hand the switching must follow "soon".

Both rules may be after-modeled as fuzzy intervals as in the case of rule R1. The "perceptible force increase" is checked by relating the force function's change in increase to the previous increase and testing the "Optimum degree" for that value using a fuzzy-interval. The "early succession" of the switching point is modeled correspondingly by relating the angular difference of the rotary displacement to the difference between the spring reversal point and the first initial angular position. This value is then rated using "fuzzy smaller" operator 52 relative to an upper limit or again by means of a fuzzy interval relating to "optimal rotation as far as the switching point".

All the advantages of the system 10 are applied when rating according to the rule R4: this feature was impossible in the methods of the state of the art.

A button 22 and the temperature control 24 assuredly will not harmonize when a button 22 that was perceived being optimal is integrated jointly with a temperature control 24 that was perceived less than optimal into a device 20. One rating criterion calls for the degree that the result of the rule R3 shall agree with the result of the rule R1, this condition being met by a "fuzzy and" linkage of the two values.

Alternatively or in addition, both the buttons 22 and also the temperature control 24 may be rated for their compliance by the degree of their statements—"is compliant", "of average compliance" and "is stiff"—being rated by means of one operator 52 for each. These three operators 52 (for instance one "fuzzy-smaller", one "fuzzy interval" and one "fuzzy larger" operator) would then categorize the operating elements 22, 24 regarding their compliance.

In such a case the degree of association of the temperature control 24 with the "stiff" operator would have to agree for harmonious operation of the climate control 20 with the degree of association of the buttons 22 with their "stiff" operators, and on that account the operators 52 then may be compared by "fuzzy same" operator. Again their "average" and "compliant" operators should agree with each other.

Also all "stiff" operators may be linked to each other by a T-standard aggregation operator in order to determine thereby the degree of association with the statement "device overall is stiff". If a result of nearly 1 is then reached, the device 20 may be described as "harmoniously stiff per se". Equivalent statements result when high values are the case when linking the "average" and compliant" operators. If on the other hand all three overall linkages of the particular operators 52 result in rather small values, then it will mean the device 20 is not harmonious per se because the operating elements 22, 24 differ in their operability.

To reach an overall inference of the quality of the climate control equipment 20, the individual ratings of the statements R1 through R4 finally are linked into an aggregation operator 52 which combines said individual ratings into an overall one. This overall rating may be put into the form of "feels good" factor, each device 20 being assigned a corresponding rating. Or an index/coefficient may be set up by means of which the devices are divided into defined rating respectively quality classes Q1, Q2, Q3.

Depending on the setting of the aggregation operator 52, the overall statement may be more or less rigorous, so that well satisfied criteria for instance might serve to compensate those satisfied less well. Individual ratings then should be weighted regarding their relevance. Illustratively the harmonious operability from the R4 statement would be more significant than for instance the force rise of a single control from the R3 statement.

It ought to be borne in mind that due the recursive division of a problem to be solved into smaller partial criteria, for instance the R1 through R4 statements, which are rated individually and then are individually assembled into one overall rating, also allow post-adjusting complex quality ratings in relatively simple manner. The basis for this feature is the hierarchical operator tree constituted by the quality functions 50.

The present invention is not restricted to one of the above discussed modes of implementation, but may be varied in many ways.

Illustratively the quality functions 50 may be self-adapting. An expert may predetermine for that purpose the structure of the quality functions whereas the system 10 automatically modifies the possible parameters 54, 55, 58 by means of illustrative ratings in order to attain an imitation as close as possible to reality of human decision making.

The system 10 accordingly would so to speak learn which are the "proper" quality functions 50. Then predetermining a rigorously defined quality function 50—and otherwise than as regards for instance wholly self-organizing—learning for instance by so-called neuronal networks, the criteria for decision could be named objectively and furthermore might be modified further by human experts.

Accordingly the rating of the quality functions 50 may also be carried out in principle using fuzzy classification, or a single or multi-dimensional threshold method, or using a neuronal network.

Elements of learning fuzzy systems are contained in so-called hybrid systems that try to combine the advantages of fuzzy systems with the learning ability of neuronal networks.

It has been shown above that the system 10 of the present invention offers not only a way to detect measured values and to analyze them but also allows harmony between operating elements 22, 24 of a component 20 and to rate them in objective manner. Illustratively the system 10 emits a high quality value (feel-good factor) when the buttons of a car radio react to an approximately equal force. This feature is sensed by the user as harmonious regardless of the absolute force required for switch operation. When a single switch deviates from its environment, it will be sensed being "stiff" or "too compliant". The system 10 therefore is able to sense this condition.

An operator tree constituted using the editor 45 in arbitrary manner is basic. If needed, the harmony of all buttons 22 within the device 20 may be defined just as is the harmony of all operating elements within a motor vehicle, for instance in relation to the operating forces of all switches 22 or to nocturnal illumination of all operating elements. In every case the quality rating of the individual components shall be linked to the defined harmony factor—a feature unavailable in the heretofore systems.

The system 10 in this manner determines a degree of quality supported by human behavior when rating the quality of a finished product. Individual criteria may be defined, weighted and linked to one another, and furthermore so-called KO criteria may be incorporated. For such purposes quality functions 50 are produced, constituted by individual operators 52 that may be weighted and even may be bound into a hierarchy by means of parameters 54, 55, 58 G. In this manner not only is it possible to determine the quality of a single device 20, but also the interaction or the harmony of several devices illustratively configured in a vehicle dashboard.

Accordingly the system of the present invention enables the following features:
  comparing production results of different periods or different production sites,
  reconstructing the quality level of individual facets,
  a user-friendly, optimized, graphic and foremost reproducible display of quality tests,
  systematic search for defect sources in products because the operator tree indicates which of the detected operating elements degrade quality by means of what parameters,
  identifying application points to increase quality,
  parallel viewing of several quality functions for instance having different tolerance limits or weightings,
  automated on-line production control,
  early detection of biases that might degrade quality,
  harmony compensation of different devices in a motor vehicle inside space,
  permanent matching of operator tree to user's needs, and
  determining objective data and criteria.

All features and advantages inclusive design particulars, spatial configurations and procedural steps explicit and implicit in the specification and the drawings, whether considered per se or in any combination, may be construed as being inventive.

The invention claimed is:

1. System (10) to test and rate operation-dependent processes or components (20) in automated production and test sequences, comprising a robot (12) that by means of at least one sensor (14, 18) at a minimum of one operating or display element (22, 24) detects measurement/test values (M) of the component (20) to be tested respectively be rated and transmits said values to an computer (40) which by means of quality functions (50) analyzes and rates said measured values (M), by means of fuzzy operators (52) imitating human rating schematics respectively fuzzy rules and based on them generate at least one rating as the result, wherein a rating diagram taking into account gradual transitions between the fixed boundary values criteria is formally reproduced by means of the quality functions, and further wherein the rating of the quality functions is implemented using a neuronal network.

2. System as claimed in claim 1, characterized in that the rating result of the rating unit (40) is in the form of at least of one "feels good" factor and/or an index.

3. System as claimed in claim 1, characterized in that selected operating functions may be fed into the operating and/or display elements (22, 24) and that during their run, mechanical, electrical, haptic, optic and/or acoustic measured values (M) are detected by the minimum of one sensor m(14, 16).

4. System as claimed in claim 1, characterized in that the measured value (M) can be detected and/or monitored as a function of activation paths and angles of the robot (12).

5. System as claimed in claim 1, characterized in that the detection and transmission of the measured values (M) takes place in real time.

6. System as claimed in claim 1, characterized in that the measured values (M) fed to the rating unit (40) are digitized.

7. System as claimed in claim 1, characterized in that the measured values (M) can be stored.

8. System as claimed in claim 1, characterized in that the rating unit (40) is a computer.

9. System as claimed in claim 8, characterized in that the computer (40) comprises at least one memory (42), one input element (44) and one output element (46).

10. System as claimed in claim 1, characterized in that the operators (52) within a quality function 50) can be mutually weighted or are mutually weighted relative to one another by parameters (54).

11. System as claimed in claim 1, characterized in that the quality functions (50) may be weighted relative to one another and/or are weighted relative to one another by means of parameters (55).

12. System as claimed in claim 1, characterized in that the quality functions (50) are arrayed hierarchically.

13. System as claimed in claim 1, characterized in that the quality functions (50) are self-adapting.

14. System as claimed in claim 1, characterized in that at least one operator (52) represents a test/measured value (M).

15. System as claimed in claim 1, characterized in that at least one operator (52) represents a perception (P).

16. System as claimed in claim 1, characterized in that at least one operator (52) represents a derived measured value (aM).

17. System as claimed in claim 1, characterized in that at least one operator (52) represents a predicate (PT).

18. System as claimed in claim 17, characterized in that the predicate (PT) is derived from a measured value (M) or a perception (P) and at least one derived measured value (aM).

19. System as claimed in claim 1, characterized in that at least one operator (50) represents a logic link (V).

20. System as claimed in claim 19, characterized in that the logic link (V) is derived from several predicates (PT) which are weighted relative to one another.

21. System as claimed in claim 19, characterized in that the logic link (V) is a conjunction.

22. System as claimed in claim 19, characterized in that the logic link (V) represents a scalable aggregation parameter.

23. System as claimed in claim 1, characterized in that the rating of the quality functions (50) is implemented using a one-dimensional or multi-dimensional threshold value method.

24. System as claimed in claim 1, characterized in that each operator (52) may be graphically displayed on the output device (46).

25. System as claimed in claim 24, characterized in that the output device (46) is a monitor.

26. System as claimed in claim 1, characterized in that each operator (52) may be modeled interactively.

27. System as claimed in claim 1, characterized in that the operators (52) may be interactively linked and/or combined with one another within a quality function (50).

28. System as claimed in claim 1, characterized in that each quality function (50) may be modeled interactively.

29. System as claimed in claim 1, characterized in that the parameters (54, 55) provided for weighting the operators (52) and/or the quality functions (50) may be entered by means of the input device (34).

30. System as claimed in claim 1, characterized in that the quality functions (5) constitute an operator tree.

31. System as claimed in claim 30, characterized in that each node of the operator tree represents an operator (52).

32. System as claimed in claim 30, characterized in that different planes and views of the operator tree may be represented on the output device (46).

* * * * *